UNITED STATES PATENT OFFICE.

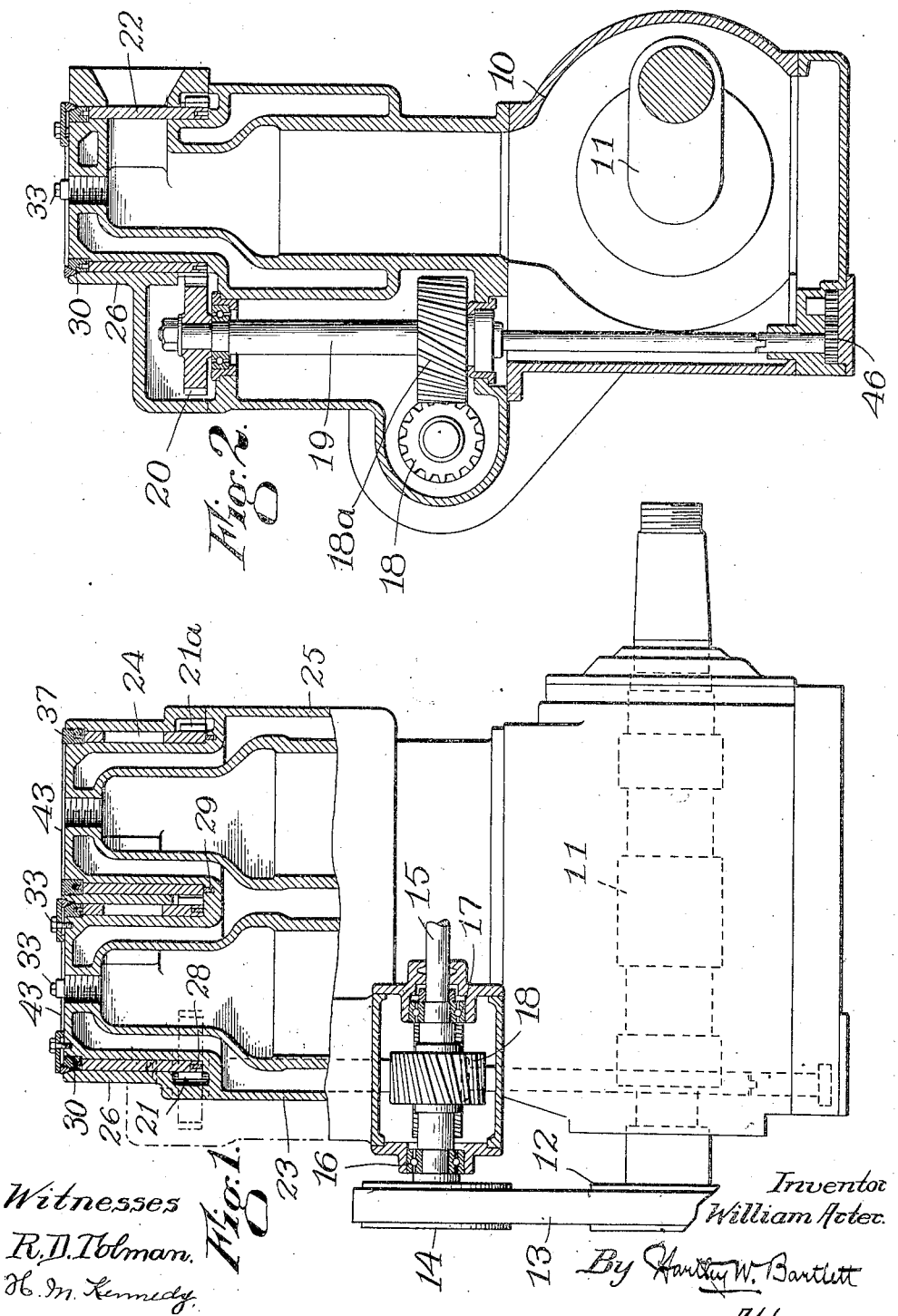

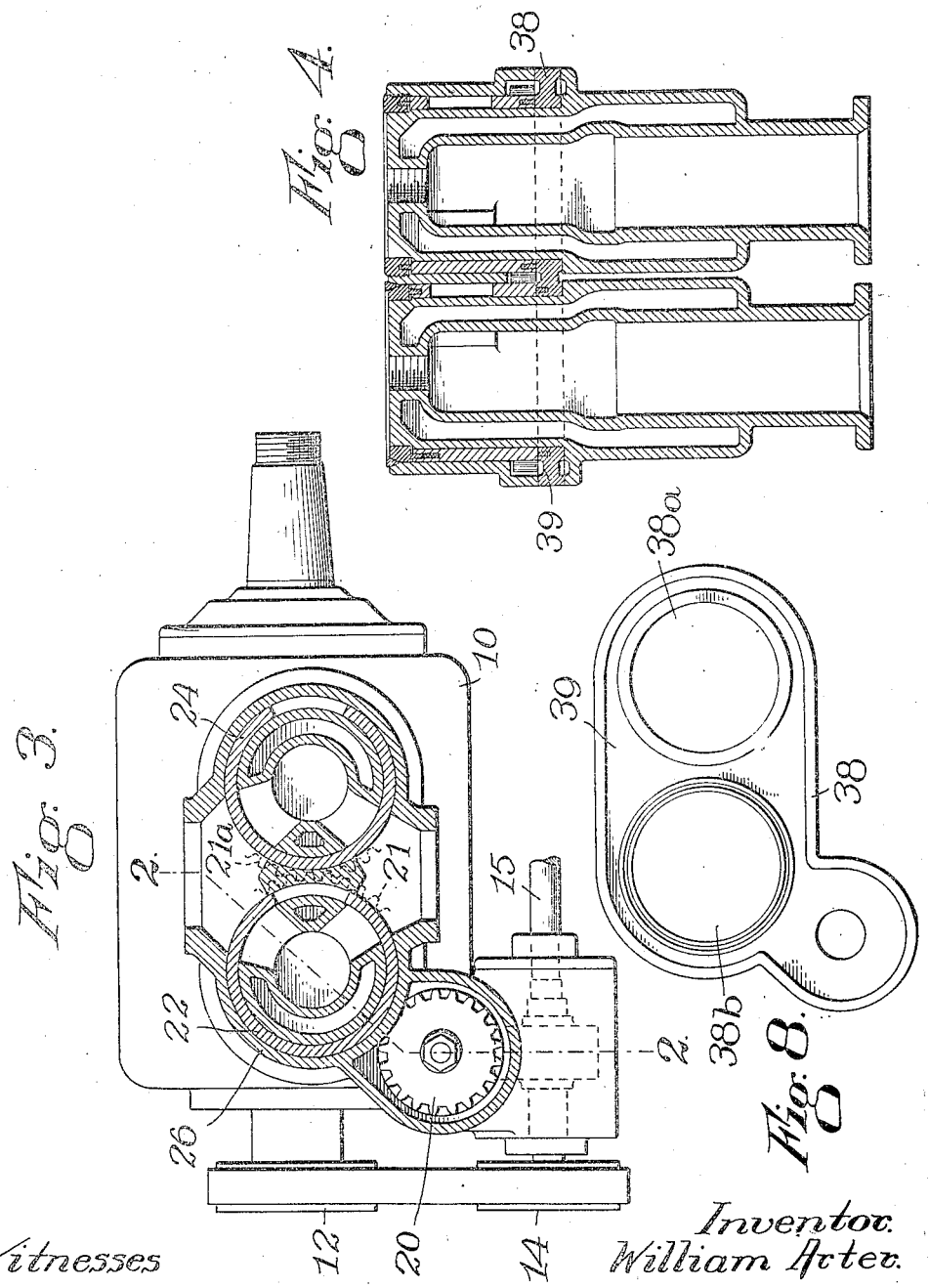

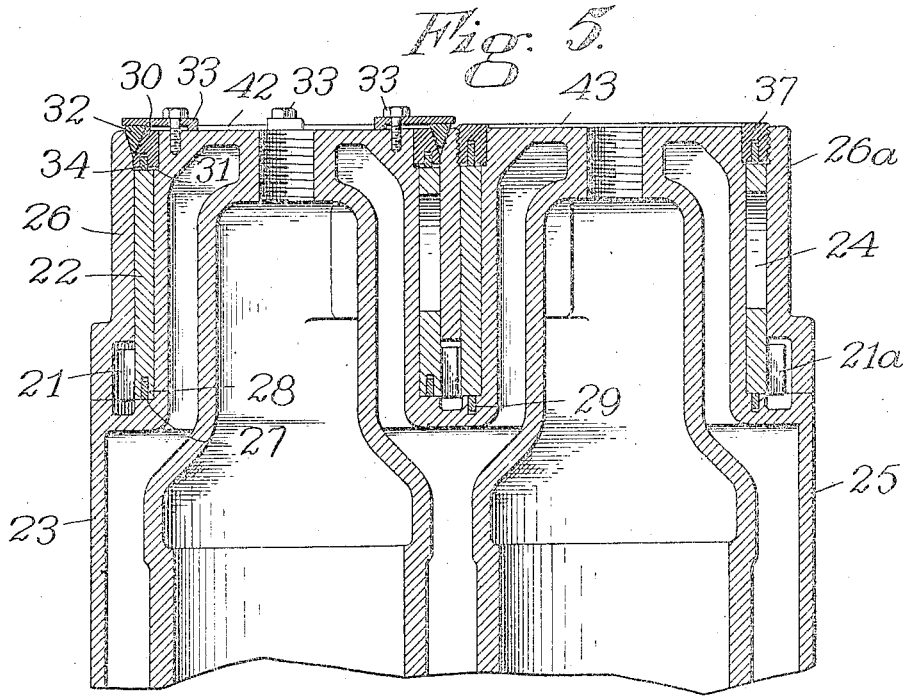
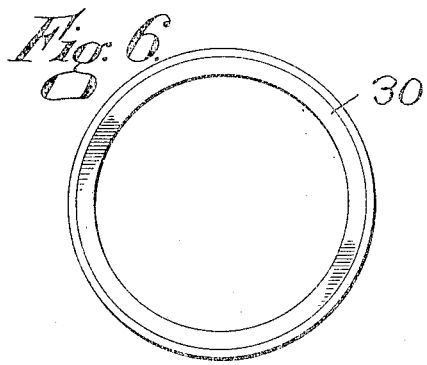
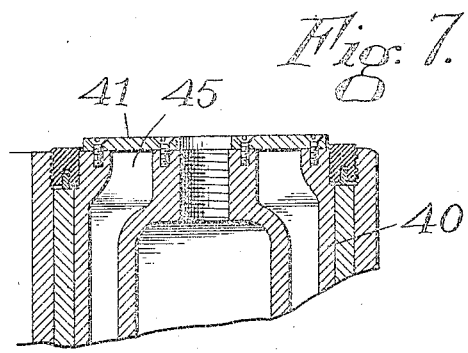

WILLIAM ARTER, OF WORCESTER, MASSACHUSETTS, ASSIGNOR OF ONE-HALF TO BERNHARD E. DELLE, OF WORCESTER, MASSACHUSETTS.

VALVE MECHANISM.

1,126,679.  Specification of Letters Patent.  Patented Feb. 2, 1915.

Application filed January 22, 1913. Serial No. 743,507.

*To all whom it may concern:*

Be it known that I, WILLIAM ARTER, a subject of the King of Great Britain, residing at Worcester, in the county of Worcester, State of Massachusetts, have invented a certain new and useful Improvement in Valve Mechanisms, of which the following is a specification, reference being had therein to the accompanying drawings.

This invention relates to internal combustion engines, but more particularly to valve mechanisms therefor and has for its object to produce an engine which is more simple to construct, more compact, and more efficient than any of the types heretofore constructed.

The valve construction to which the invention is here applied is what is commonly known as the rotary sleeve type.

One feature of this invention is the sleeve retaining ring which prevents any escape of gases about and permits of easy access to the sleeve valve.

Further features are the means for driving one sleeve valve directly from the lay shaft, the driving of the sleeve on the next cylinder directly from this sleeve, and many other features which will be fully described hereinafter and included in the claims.

Referring to the drawings:—Figure 1 is a side elevation of one embodiment of the invention complete with portions in section to show fully the interior construction thereof. Fig. 2, section on line 2—2 of Fig. 3. Fig. 3, same as Fig. 1, plan view. Fig. 4, vertical section of a modified form of the invention, as will be fully described hereinafter. Fig. 5, portion of Fig. 1 on enlarged scale, as will be fully described hereinafter. Fig. 6, detail view, as will be fully described hereinafter. Fig. 7, modified form, as will be fully described hereinafter. Fig. 8, detail view, as will be fully described hereinafter.

In the drawings the invention comprises a crank case 10 in which is mounted the usual crank shaft 11 provided with suitable bearings. Upon one extremity of this shaft 11 is a pulley or sprocket 12 upon which operates a belt or chain 13 to drive a corresponding pulley or sprocket 14 upon the lay shaft 15 mounted in bearings 16 and 17.

This shaft has mounted thereon a spiral gear 18 which meshes with a corresponding gear 18ª upon the vertical shaft 19 which shaft is provided at its upper extremity with a gear 20 adapted to mesh with the teeth 21 on the outer wall of the rotary sleeve 22 about the cylinder 23. These teeth in the present embodiment are in mesh with corresponding teeth 21ª on the outer wall of the sleeve 24 on the cylinder 25. If more than two cylinders are used the third sleeve may be driven by the second, the fourth by the third and so on.

About the sleeves 22 and 24 fits the cover member 26 which may be secured to the cylinder by bolts or any other suitable means.

Between the lower edge of the sleeve 22 and the shoulder 27 on the cylinder, is set a packing ring 28 which is here seated in a slot in the lower portion of the sleeve and its lower edge is in spring pressed contact with the upper face of the shoulder though this packing ring may be seated in the shoulder and contact with the base of the sleeve as does the packing ring 29 beneath the sleeve 24 or may be part in the sleeve and part in the shoulder, as will readily be seen.

Between the outer wall of the upper portion of the cylinder 23 and the cover member 26 fits the sleeve retaining ring 30 which is here preferably held in firm contact with the shoulder 31 on the cylinder by the wedging ring 32 forced against the bevel corner of the ring 30 by clamps 33, any desired number of which may be used. This bevel may be upon the inner edge of the ring 30 instead of the outer corner and the wedging ring act between this edge and the cylinder instead of between the outer edge and the cover member, as will readily be seen. In this ring 30 is a packing ring 34 contacting with the upper edge of the sleeve 22 though this packing ring may be in a slot in the sleeve, as was the packing ring 28.

On the annular shoulder 31 against which the sleeve retaining ring presses may be placed a ring of soft copper or other suitable packing material to form an absolutely tight joint at that point between the sleeve retaining ring and the cylinder. The wedging ring 32 may have its operating faces covered with packing material as indicated by the dark lines in Figs. 1, 2, 4 and 5, if desired.

Between the cover member 26 and the cylinder 25 fits a sleeve retaining ring 37 corresponding to the ring 30 on the cylinder 23 but the method of retaining this ring in its place is a modification of the method of securing the ring 30 in that the ring is threaded to mesh with corresponding threads on the inner wall of the cover member but either of these forms might be used on either cylinder. The threading might be on the inside of the retaining ring and on the outside of the cylinder instead of on the outside of the ring and the inside of the cover member. These modifications are so very evident that it has not been thought necessary to show them in the drawings. The sleeve retaining rings allow the sleeve packing to be readily removed at any time and new packing rings inserted.

If the sleeve retaining ring were omitted, it would be practically impossible to machine a cover member for two or more cylinders to produce tight joints between this member and the cylinder. The distance between the joints of the cover member and the cylinder at the top and bottom must be exact and even if it were possible to machine these joints absolutely exactly, the difference in thickness of the packings would render one of the joints imperfect. The sleeve retaining ring is movable parallel to the axis of the cylinder and can therefore be adjusted to make a perfect fit so that it is unnecessary to have the machining exact. With the sleeve retaining ring, the packing for the top edge of the sleeve may be seated in a groove in this ring when it is not desirable to have this packing in the sleeve. If no sleeve retaining ring were used it would be necessary to form a groove in the cover member. To form such a groove in the cover member and obtain perfect packing would be an exceedingly difficult matter.

In the embodiments of the invention hereinbefore described the cylinders have been cast in block but when these cylinders are cast separately, it is particularly important that they be properly spaced in order that the sleeve driving gears may mesh properly. In Figs. 4 and 8 is shown a cylinder retaining plate 38 having formed therein loops 38ª and 38ᵇ which fit over the cylinders. This plate acts as a bearing plate for the sleeves and as an oil basin to permit the gears on the sleeves and the sleeves themselves to be properly oiled and to form an oil seal at the bottom edge of the sleeves. The oil flows about in the depressed surface or channel 39. Fig. 8 shows a plan of this plate 38 detached. If more than two cylinders are used the number of loops in this plate would correspond with the number of cylinders. The oil is forced up onto this plate 38 by the oil pump and overflow means may be provided.

In the embodiment shown in Fig. 7, the top of the outer casing of the cylinder 40 is formed of a separate plate 41 secured thereto instead of being integral therewith as were the walls 42 and 43 of the cylinders 23 and 25 respectively in the embodiment shown in Fig. 5. This greatly facilitates the casting of the cylinder as the core of the water jacket may be drawn at the open end. At the lower extremity of the vertical shaft 19 is provided an oil pump 46 which is here of the intermeshing gear type. By driving the valves from the lay shaft instead of from the crank shaft as is usually customary, a single shaft driven by a spiral gear operates the valves and the oil pump and thus a small number of shafts and gears are necessary.

The applicant is aware that a considerable number of changes in the construction and arrangement of parts may be made by anyone skilled in the art without departing from the scope of his invention and therefore he does not care to be limited to the particular embodiments herein shown and described.

What I claim as my invention and desire to secure by Letters Patent is:—

1. In a device of the class described, a ported cylinder, a sleeve revolubly fitting about said cylinder for controlling the passage of fluid through the ports in said cylinder, a cover member about said sleeve, and packing means interposed between the upper portion of said cover member and said cylinder and adjustable longitudinally of the axis of said cylinder to form a tight joint between these members.

2. In a device of the class described, a ported cylinder, a sleeve revoluble about said cylinder for controlling the passage of fluid through the ports in said cylinder, a cover member about said sleeve, and a sleeve retaining ring about said sleeve between the upper portion of said cover member and said cylinder and adjustable longitudinally of the axis of said cylinder.

3. In a device of the class described, a ported cylinder, a sleeve revoluble about said cylinder for controlling the passage of fluid through the ports in said cylinder, a cover member about said sleeve and secured at its base to said cylinder, and a packing ring interposed between the upper portion of said cover member and said cylinder and adjustable longitudinally of the axis of said cylinder.

4. In a device of the class described, a ported cylinder, a sleeve revoluble about said cylinder for controlling the passage of fluid through the ports in said cylinder, and a ring fitting about the walls of said cylinder above said sleeve and adjustable longitudinally of the axis of said cylinder to form a tight joint between the upper edge of said sleeve and said cylinder.

5. In a device of the class described, a ported cylinder, a port controlling sleeve revoluble about said cylinder and having its lower edge resting upon an annular shoulder upon the outer wall of said cylinder, and a ring fitting about said cylinder above the upper edge of said sleeve and adjustable longitudinally of the axis thereof into contact with said upper edge.

6. In a device of the class described, a ported cylinder, a port controlling sleeve revoluble about said cylinder and having its lower edge resting upon an annular shoulder upon the outer wall of said cylinder, packing means interposed between said lower edge and said shoulder, a ring fitting about said cylinder above the upper edge of said sleeve and adjustable longitudinally of the axis thereof toward said upper edge, and packing means interposed between said ring and said upper edge.

7. In a device of the class described, a ported cylinder, a port controlling sleeve revoluble about said cylinder and having its lower edge resting upon an annular shoulder upon the outer wall of said cylinder, packing means interposed between said lower edge and said shoulder, a ring fitting about said cylinder above the upper edge of said sleeve and adjustable toward said upper edge, and packing means interposed between said ring and said upper edge and between said ring and said cylinder.

8. In a device of the class described, a ported cylinder, a port controlling sleeve revoluble about said cylinder and having its lower edge resting on an annular ring about the outer wall of said cylinder, packing means interposed between the lower edge of said sleeve and said ring, a second ring fitting about said cylinder above said sleeve and adjustable longitudinally of the axis of said cylinder to coact with said sleeve to produce a tight joint at said lower edge thereof.

9. In a device of the class described a ported cylinder, a port controlling sleeve revoluble about said cylinder, a cover member about said sleeve, a ring fitting between said cover member and said cylinder above said sleeve and adjustable longitudinally of the axis of said cylinder, an annular slot in the under face of said ring, and a packing ring having its upper portion seated in said slot and its lower edge adapted to contact with the upper edge of said sleeve to form a tight joint between said upper edge and said ring.

10. In a device of the class described, a plurality of separate cylinders provided with inlet and outlet ports therein, port controlling sleeves upon each of said cylinders, teeth arranged about the outer wall of each of said sleeves, a driving gear meshing with the teeth on the sleeve on one of said cylinders and the teeth on each succeeding sleeve meshing with the teeth on the sleeve on the preceding cylinder, and a frame enveloping all of said cylinders adapted to maintain the axis of each cylinder at a fixed distance from the axis of each of the other cylinders.

11. In a device of the class described, a plurality of separate cylinders provided with inlet and outlet ports therein, port controlling sleeves upon each of said cylinders, and a plate provided with orifices therein each adapted to receive one of said cylinders and the portions of the plate about each of said orifices forming a bearing for the sleeve on the cylinder passing therethrough.

12. In a device of the class described, a plurality of cylinders provided with inlet and outlet ports, sleeves upon each of said cylinders for controlling the passage of fluid through said ports, a plate provided with orifices therein each adapted to receive one of said cylinders and the portions of said plate about each of said orifices forming a bearing for the sleeve on the cylinder passing therethrough, and oil conducting channels on said plate adapted to supply oil to each of said bearing surfaces.

13. In a device of the class described, a ported cylinder, a port controlling sleeve revoluble about said cylinder, teeth about the outer wall of said sleeve, a revoluble shaft, a gear secured upon said shaft in mesh with the teeth on said sleeve, and a pump driven by said shaft to provide a supply of lubricating fluid to said sleeve.

14. In a device of the class described, a ported cylinder, a port controlling sleeve revoluble about said cylinder, teeth about the outer wall of said sleeve, a revoluble shaft, a gear secured upon said shaft in mesh with the teeth on said sleeve, a pump driven by said shaft to provide a supply of lubricating fluid to said sleeve, and means for driving said shaft.

15. In a device of the class described, a ported cylinder, a port controlling sleeve revoluble about said cylinder, an annular shoulder on said cylinder above the upper edge of said sleeve, and a ring adapted to fit about said cylinder in contact with said shoulder.

16. In a device of the class described, a ported cylinder, a port controlling sleeve revoluble about said cylinder, an annular shoulder formed on the outer wall of said cylinder above the upper edge of said sleeve, a sleeve retaining ring adapted to fit about said cylinder and to be held in contact with said shoulder, and packing interposed between said shoulder and said ring.

17. In a device of the class described, a ported cylinder, a port controlling sleeve revoluble about said cylinder, an annular shoulder on said cylinder above the upper edge of said sleeve, a ring adapted to fit about said cylinder in contact with said shoulder, and means for retaining said ring in such contact.

In testimony whereof I affix my signature in the presence of two witnesses.

WILLIAM ARTER.

Witnesses:
 HARTLEY W. BARTLETT,
 HANNAH M. KENNEDY.